US009384895B2

(12) United States Patent
Donhowe et al.

(10) Patent No.: US 9,384,895 B2
(45) Date of Patent: Jul. 5, 2016

(54) POLYTETRAFLUOROETHYLENE FILM CAPACITOR

(75) Inventors: Mark N. Donhowe, Newark, DE (US); Jeffrey M. Lawler, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 13/486,288

(22) Filed: Jun. 1, 2012

(65) Prior Publication Data

US 2012/0307419 A1 Dec. 6, 2012

Related U.S. Application Data

(60) Provisional application No. 61/492,991, filed on Jun. 3, 2011.

(51) Int. Cl.
| | |
|---|---|
| *H01G 4/08* | (2006.01) |
| *H01G 4/06* | (2006.01) |
| *H01G 4/20* | (2006.01) |
| *H01G 4/18* | (2006.01) |
| *H01G 4/015* | (2006.01) |
| *H01G 4/32* | (2006.01) |

(52) U.S. Cl.
CPC ............... *H01G 4/18* (2013.01); *H01G 4/015* (2013.01); *H01G 4/32* (2013.01)

(58) Field of Classification Search
CPC .............. H01G 4/18; H01G 4/20; H01G 4/32
USPC .......................................... 361/323, 311, 312
See application file for complete search history.

(56) References Cited

U.S. PATENT DOCUMENTS

| | | | | |
|---|---|---|---|---|
| 3,202,892 | A * | 8/1965 | Netherwood | 361/273 |
| 4,996,097 | A * | 2/1991 | Fischer | 428/220 |
| 5,374,473 | A | 12/1994 | Knox et al. | |
| 5,610,796 | A | 3/1997 | Lavene | |
| 7,521,010 | B2 * | 4/2009 | Kennedy et al. | 264/113 |
| 2010/0020468 | A1 * | 1/2010 | Tan et al. | 361/311 |
| 2010/0110609 | A1 | 5/2010 | Koh et al. | |
| 2011/0228442 | A1 * | 9/2011 | Zhang | H01G 4/18 361/311 |

FOREIGN PATENT DOCUMENTS

| | | |
|---|---|---|
| JP | 6-41124 | 5/1994 |
| JP | 2007-534523 A | 11/2007 |
| JP | 2010-182859 A | 8/2010 |
| WO | WO 2005/105434 A2 | 11/2005 |
| WO | WO 2011/059823 | 5/2011 |

OTHER PUBLICATIONS

PCT International Search Report—PCT/US2012/040392 dated Aug. 13, 2012.

\* cited by examiner

*Primary Examiner* — Eric Thomas
*Assistant Examiner* — Arun Ramaswamy
(74) *Attorney, Agent, or Firm* — Kilpatrick Townsend & Stockton LLP (57) ABSTRACT

A capacitor having a first electrode, a second electrode, a dielectric layer of a PTFE film having a dielectric strength greater than about 500 V/um, a tensile strength of greater than about 10,000 psi (or, alternatively, a tensile yield strength of greater than about 2,000 psi), and a thickness less than about 20 microns disposed between the first electrode and the second electrode.

26 Claims, 8 Drawing Sheets

POLYTETRAFLUOROETHYLENE FILM CAPACITOR

RELATED APPLICATION

The present application claims the benefit of commonly owned U.S. Provisional Application No. 61/492,991 filed Jun. 3, 2011.

FIELD OF THE INVENTION

The present invention relates to polymer film capacitors, and in particular, to both metalized-film and foil-film capacitors with a polytetrafluoroethylene (PTFE) polymer film that are operable at temperatures up to about 250° C.

BACKGROUND OF THE INVENTION

Generally, polymer film capacitors consist of two metal electrodes separated by a layer of dielectric film. The two metal electrodes can be relatively thick, on the order of 3 to 100 um, to create a film-foil capacitor. Or the metal electrodes can be deposited directly on to the polymer film, a thickness of less than 1 um, thereby creating a metalized film capacitor. Artisans practiced in the art also combine these electrode styles, creating hybrid film capacitors.

One of the issues preventing wider spread adoption of film capacitors is the limited temperature range. Most polymer film capacitors use polymer resins with glass transition temperatures less than 150° C. This limits the continuous use operating temperature to typically less than 120° C. Capacitors manufactured with higher glass transition temperature polymers include PPS (polyphenylenesulfide), PI (polyimide, e.g., Kapton), PC (polycarbonate), and PTFE. However, these and other polymers have lacked additional properties required to make film capacitors. A few of these additional desired properties are low dielectric loss, an ability to self-clear, high dielectric strength, and high mechanical strength.

SUMMARY OF THE INVENTION

The present invention provides high operating temperature film capacitors having a PTFE polymer film that overcomes the limitations of known films for polymer film capacitors.

Specifically, the present invention provides a capacitor having a first electrode, a second electrode, a dielectric layer of a PTFE film having a dielectric strength greater than about 500 V/um, a tensile strength of greater than about 10,000 psi (or, alternatively, a tensile yield strength of greater than about 2,000 psi), and a thickness less than about 20 microns disposed between the first electrode and the second electrode. Preferably, the PTFE film is a densified expanded PTFE film, and the thickness of at least one of the first and second electrodes is less than about 100 nm, having been deposited by a process of vacuum deposition for example evaporation or sputtering. Such a capacitor is self-clearing. Alternatively, at least one of the first and second electrodes is a metal foil with a thickness greater than about 2 microns. Also preferably, the dielectric film has a thickness less than about 15 microns, more preferably less than about 10 microns, most preferably about 6 microns. The inventive capacitor surprisingly has a capacitance change of less than 10% from room temperature to about 250 degrees C. This surprisingly stable high temperature operability is a dramatic advance in capacitor art.

DETAILED DESCRIPTION OF THE INVENTION

The PTFE polymer film capacitor in which the invention may be embodied can be a film-foil style capacitor or a metalized film style capacitor or a hybrid of the two. The PTFE film is a result of the novel processing technology described in U.S. Pat. No. 5,374,473 to Knox et al. ("Knox '473") and in U.S. Pat. No. 7,521,010 to Kennedy et al. ("Kennedy '010"). This unique PTFE film, fabricated with the processes detailed in Knox '473 and Kennedy '010, exhibits improved properties that overcome the limitations of other polymers attempted in the manufacture of high operating temperature film capacitors.

Metalized film capacitors are preferred for high reliability applications due to their ability to self-heal. Self-healing is the process by which the thin metal electrode vaporizes during an electric field breakdown event, resulting in an insignificant area of the electrode being lost but the capacitor still able to continue functioning. This phenomenon is commonly termed "graceful failure" and is a desired attribute, not only for mission critical applications but also for applications that must endure transient voltage spikes such as switched modulated voltages for driving motors. Not all dielectric polymers self-heal effectively.

The manufacturing process for polymer film capacitors involves alternating layers of dielectric film and electrode wound into a roll (or alternatively, stacked upon one another) with a stagger between alternating layers of electrodes such that the anode electrode is at one end of the roll and the cathode electrode the other end. The ends are then arc-sprayed with a metal, typically zinc, and electrode leads are applied and the device is packaged in an appropriate manner. Some of the commonly used electrodes are aluminum, copper, silver, and zinc. Some of the commonly used plastic films are polypropylene (PP) and polyester (PET). These devices are widely used in the power electronics industry.

Figure 1A:
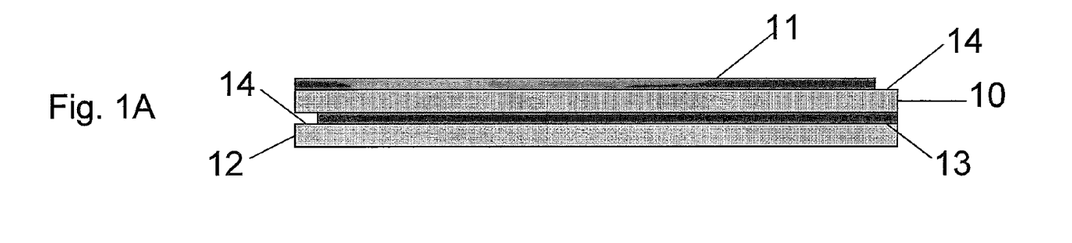
FIG. 1A and FIG. 1B show side cross-sectional views of the dielectric films and electrodes inside a capacitor according to an exemplary embodiment of the present invention.

FIG. 1A shows a cross-section of the alternating layers of dielectric films and electrodes of an exemplary embodiment of the present invention. Film 10 is positioned next to anode electrode 11. Film 12 is positioned next to cathode electrode 13. Electrodes 11 and 13 are narrower than dielectric films 10 and 12 such that a margin 14 exists. Typically dielectric films 10 and 12 are the same material and typically electrodes 11 and 13 are the same material. The electrodes can be metal foils, typically greater than 2 um, that can be wound with the film. Or the electrodes can be vacuum deposited directly on to the dielectric film thereby forming a metalized film. The thickness of the metal layer on the film is typically less than 100 nm.

Figure 1B:
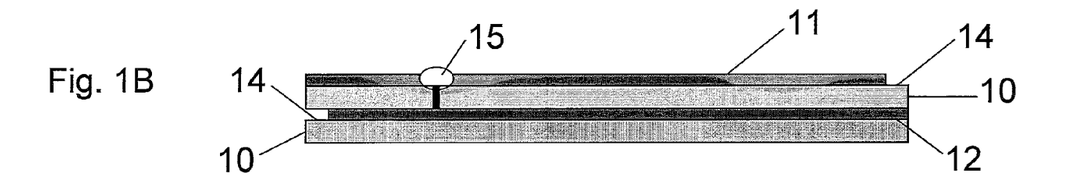
Figure 1C:
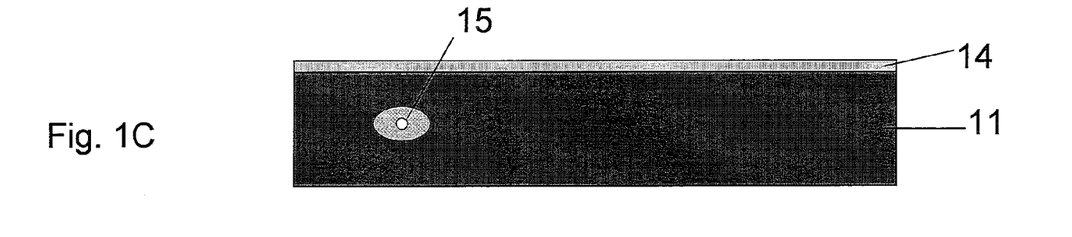
FIG. 1C shows a top view of a metalized film inside a capacitor according to an exemplary embodiment of the present invention.

With respect to the self-clearing aspect of the metalized film embodiment of the present invention, when anode electrode 11 (for example) experiences an electric field breakdown event, it produces a vaporized area 15 where the electrode is lost, as shown in FIG. 1B. As illustrated by the top view of electrode 11 in FIG. 1C, however, the vaporized area 15 is self-contained enough such that the anode 11 continues functioning.

The main reason traditional PTFE films have not enabled wide spread use in demanding high operating temperature capacitors is the quality of traditional PTFE film is poor. PTFE film is typically manufactured by a cast film process in which the PTFE resin is "cast" on a liner then melted to form a film. Another commonly used process for manufacturing PTFE film is skiving whereby thinner PTFE films are cut or shaved from a thicker preformed article. Both of these PTFE film manufacturing methods are insufficient in producing films with the mechanical strength required to endure the capacitor manufacturing process which requires winding films on a mandrel. Cast or skived PTFE films tend to stretch and neck down when wound on a mandrel; they do not have a high enough mechanical tensile strength. The film produced according to the process detailed in Kennedy '010 exhibits tensile strengths greater than 10,000 psi in the machine direction, adequate for allowing the film to be wound on a mandrel without stretching. Most surprisingly, with the present invention, a capacitor having such a film is capable of suitable performance even at high temperatures up to about 250 degrees C.

Various films were obtained and tested for use as capacitors as described below:

Film A: densified expanded PTFE film, 18 micron thick, obtained from W. L. Gore & Associates, Inc.;

Film B: densified expanded PTFE film, 6 micron thick, obtained from W. L. Gore & Associates, Inc.;

Film C: cast PTFE film, 7 um thick, obtained from Saint-Gobain Performance Plastics Corporation;

Film D: skived PTFE film, 14 um thick, obtained from DeWAL Industries, Inc.;

Film E: polyimide (Kapton), 12 µm thick, obtained from American Durafilm Co., Inc.

Film F: polycarbonate (PC), 6 µm thick, obtained from Arizona Capacitors, Inc.

Film G: metalized (Al, ~2 Ω/sq.) polyphenylenesulfide (PPS), 6 µm thick, obtained from Arizona Capacitors, Inc.;

Film H: metalized (Al, ~2 Ω/sq.) polypropylene (PP), 4 µm thick, obtained from Arizona Capacitors, Inc.;

Film I: metalized (Al, ~2 Ω/sq.) polyester (PET), 6 µm thick, obtained from Arizona Capacitors, Inc.

EXAMPLES

Prototype capacitors were built using the common-place "jelly roll" manufacturing process for both metalized film and foil capacitors. The ends of the wound films were thermal arc end sprayed with either copper or a Babbitt alloy. Wire connection leads were then soldered to the end spray to enable connection to test clips. The capacitors were measured for changes in capacitance and dissipation factor over temperature using either a Instek LCR-819 meter or a Kiethley 3330 LCZ meter.

Inventive Example 1

Film-foil capacitors were built with Film A wound with 12 µm thick copper foil. A copper end spray was used for electrode end termination.

Inventive Example 2

Film-foil capacitors were built with Film B wound with 12 µm thick copper foil. A copper end spray was used for electrode end termination.

Comparative Example A

Film-foil capacitors were built with Film E wound with 12 µm thick copper foil. A copper end spray was used for electrode end termination.

Comparative Example B

Figure 2:
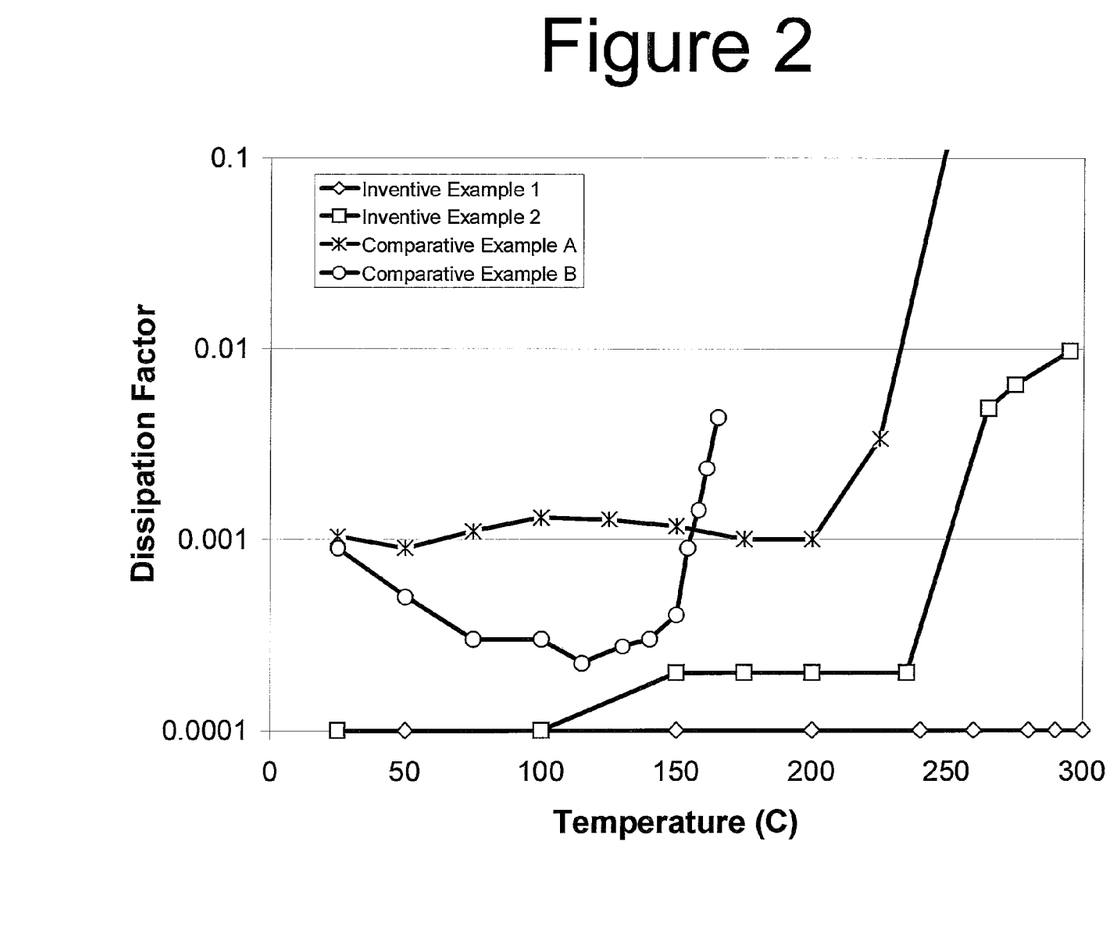
FIG. 2 is a graph of dissipation factor vs temperature for certain inventive and comparative examples.

Film-foil capacitors were built with Film F wound with 5 µm aluminum foil. A babbitt end spray was used for electrode end termination FIG. 2 shows a comparison of the dissipation factor over temperature for film-foil capacitor construction of Comparative Examples A and B versus Inventive Examples 1 and 2. The dissipation factor was measured using a Kiethley 3330 LCR meter with a 1 V test signal at 1 kHz. Comparative Example A, comprising a polyimide film, exhibited 0.1% loss from room temperature up to about 200 degrees C. above which the loss factor increased dramatically. Comparative Example B, comprising a polycarbonate film, showed an increase in loss above 150 degrees C. Both of these films are unsuitable for operating as capacitors above 200 degrees C. In contrast, Inventive Example 1 stayed at the measurement floor throughout the temperature range from room temperature up to 300 degrees C. Inventive Example 2 also had extremely low dissipation factor but did see an increase in loss about 250 degrees C. Both of the inventive examples would be suitable for building film-foil capacitors that operate up to about 250 degrees C.

Figure 3:
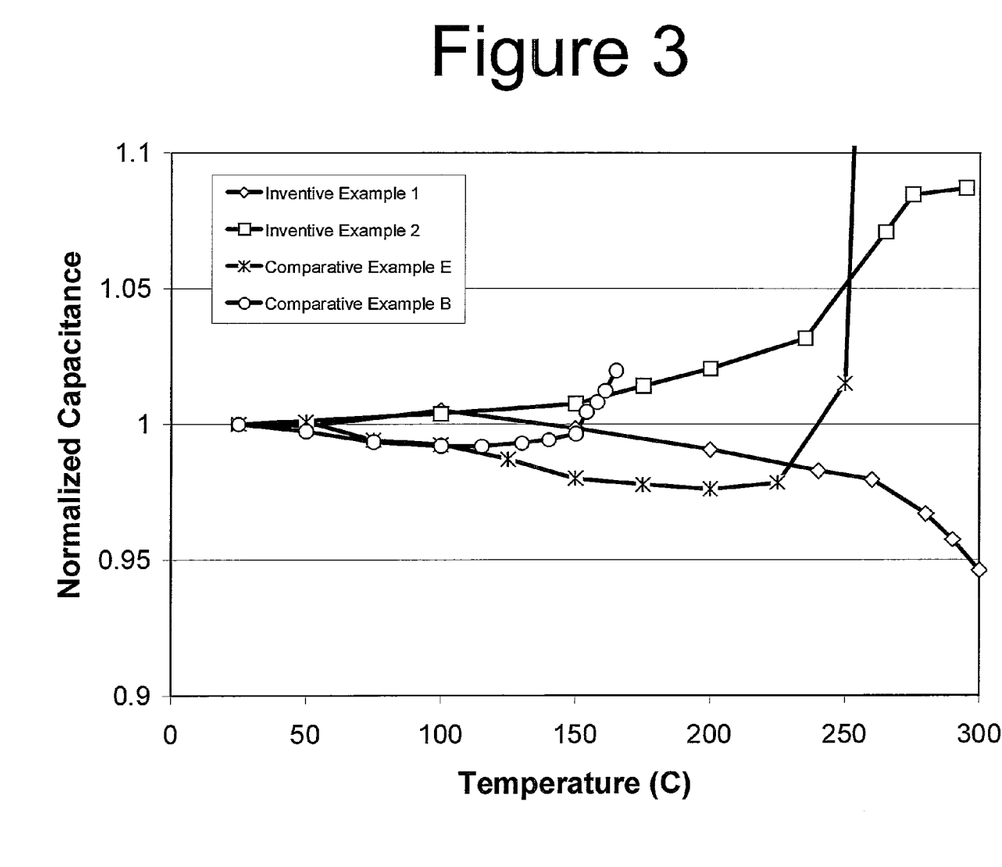
FIG. 3 is a graph of normalized capacitance vs temperature for certain inventive and comparative examples.

FIG. 3 shows a comparison of the relative change in capacitance over temperature for film-foil capacitor construction of Comparative Examples A and B versus Inventive Examples 1 and 2. The capacitance was measured using a Kiethley 3330 LCR meter with a 1 V test signal at 1 kHz. Comparative Example A, comprising a polyimide film, showed little change from room temperature up to about 250 degrees C. Comparative Example B, comprising a polycarbonate film, showed an increase in loss above 150 degrees C. Both of these films are unsuitable for operating as capacitors at high temperatures. In contrast, both Inventive Example 1 and Inventive Example 2 stayed within 5% of the room temperature capacitance all the way up to about 250 degrees C. Both of the inventive examples would be suitable for building film-foil capacitors that operate up to about 250 degrees C.

The Inventive Examples 1 and 2 are surprising results. Previous attempts to wind competitive PTFE films resulted in the film stretching as the mechanical strength of the film could not withstand the winding tension. Capacitor manufacturers would use thicker PTFE films for this reason. In addition, the capacitor manufacturers would often use multiple layers of PTFE film to ensure any pinholes or defects in the film that would lead to dielectric breakdown did not overlap. The present invention provides a single layer of PTFE film has been used in a film-foil construction capacitor. Furthermore, this result is even more impressive when considering Inventive Example 2 is only 6 um thick.

Prototype capacitors were next built using metalized film using the common-place "jelly roll" manufacturing process.

Inventive Example 3

Film A was metalized with evaporated aluminum (~6Ω/□) approximately 0.875" wide with a 0.125" free margin and then slit into approximately 1" strips. A left margin strip was wound with a right margin strip using the conventional wound metalized film capacitor construction technique. A copper end spray was used and wire leads were epoxied to the end spray.

Inventive Example 4

Film B was metalized with evaporated aluminum (~6Ω/□) approximately 0.875" wide with a 0.125" free margin and then slit into approximately 1" strips. A left margin strip was wound with a right margin strip using the conventional wound metalized film capacitor construction technique. A copper end spray was used and wire leads were epoxied to the end spray.

Comparative Example C

1" wide slit pairs (left, right margin) of Film G (metalized PPS) were rolled into a capacitor as described above. A Babbitt alloy end spray was applied to both ends and wire leads were soldered to the ends.

Comparative Example D

1" wide slit pairs (left, right margin) of Film H (metalized PP) were rolled into a capacitor as described above. A Babbitt alloy end spray was applied to both ends and wire leads were soldered to the ends.

Comparative Example E

1" wide slit pairs (left, right margin) of Film I (metalized PET) were rolled into a capacitor as described above. A Babbitt alloy end spray was applied to both ends and wire leads were soldered to the ends.

Figure 4:
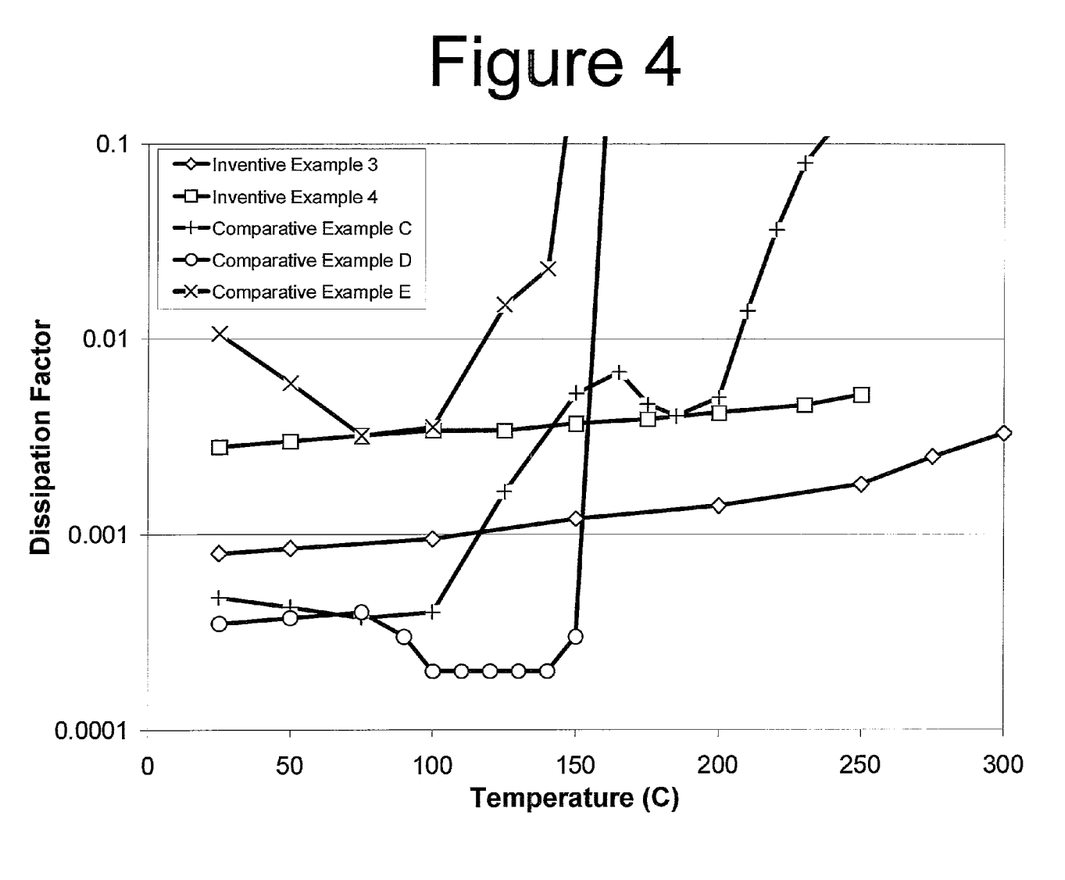
FIG. 4 is a graph of dissipation factor vs temperature for certain inventive and comparative examples.
Figure 5:
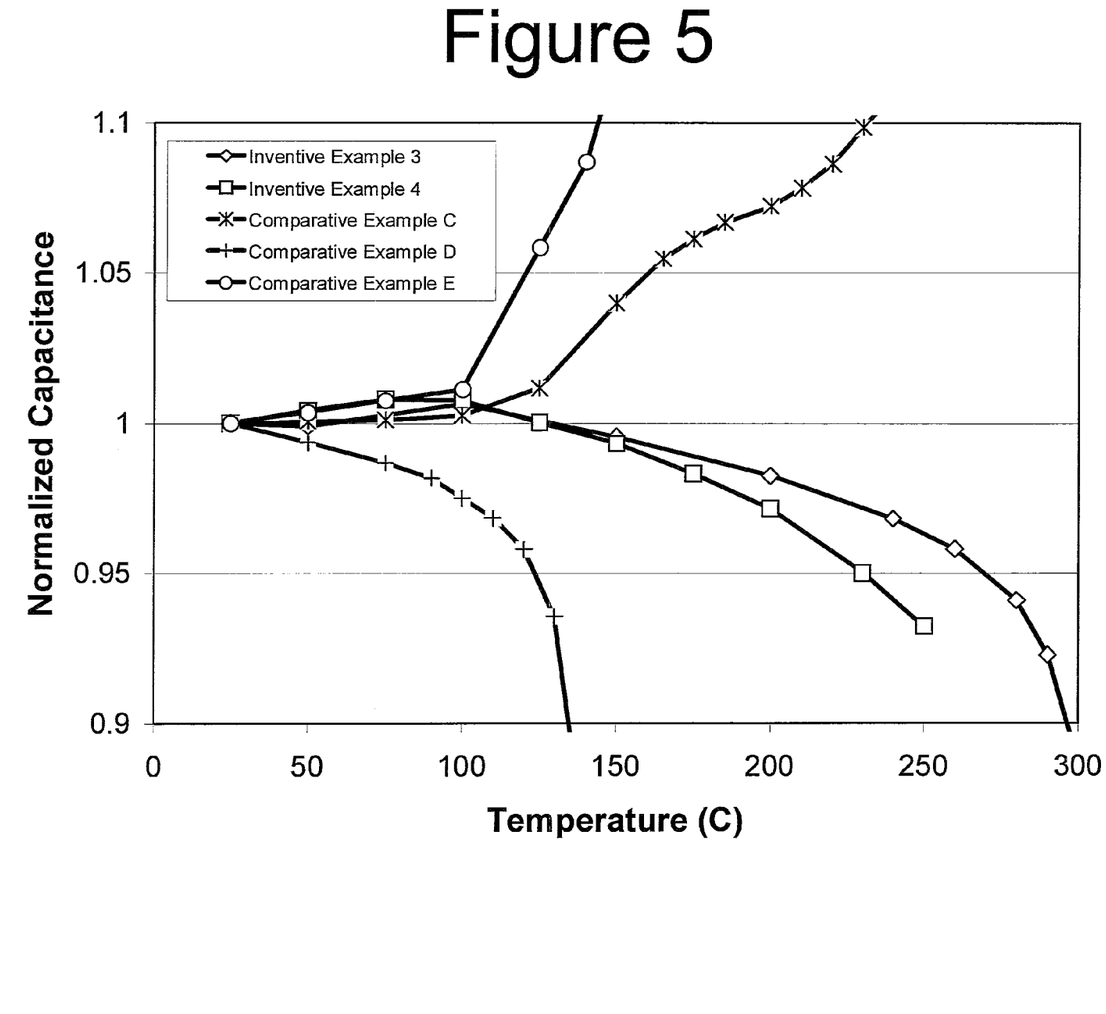
FIG. 5 is a graph of normalized capacitance vs temperature for certain inventive and comparative examples.

Inventive Examples 3 and 4 along with Comparative Examples C, D, and E were tested using the same procedures as for the foil capacitors described above. FIG. 4 shows that the dissipation factor of Inventive Examples 3 and 4 are below 1% from room temperature out to beyond 250 degrees C. whereas Comparative Examples C, D, and E are all above 1% at temperatures greater than approximately 200 degrees C. FIG. 5 shows the relative change in capacitance of the metalized film capacitors. Only Inventive Examples 3 and 4 showed less than 10% change in capacitance from room temperature out to 250 degrees C.

Heretofore a metalized film capacitor that operated at temperatures exceeding approximately 200 degrees C. did not exist. Comparative Examples C, D, and E confirmed this result. However, Inventive Examples 3 and 4 showed that it is indeed possible to build a metalized film capacitor that is capable of operating at temperatures exceeding approximately 200 degrees C.

Figure 6:
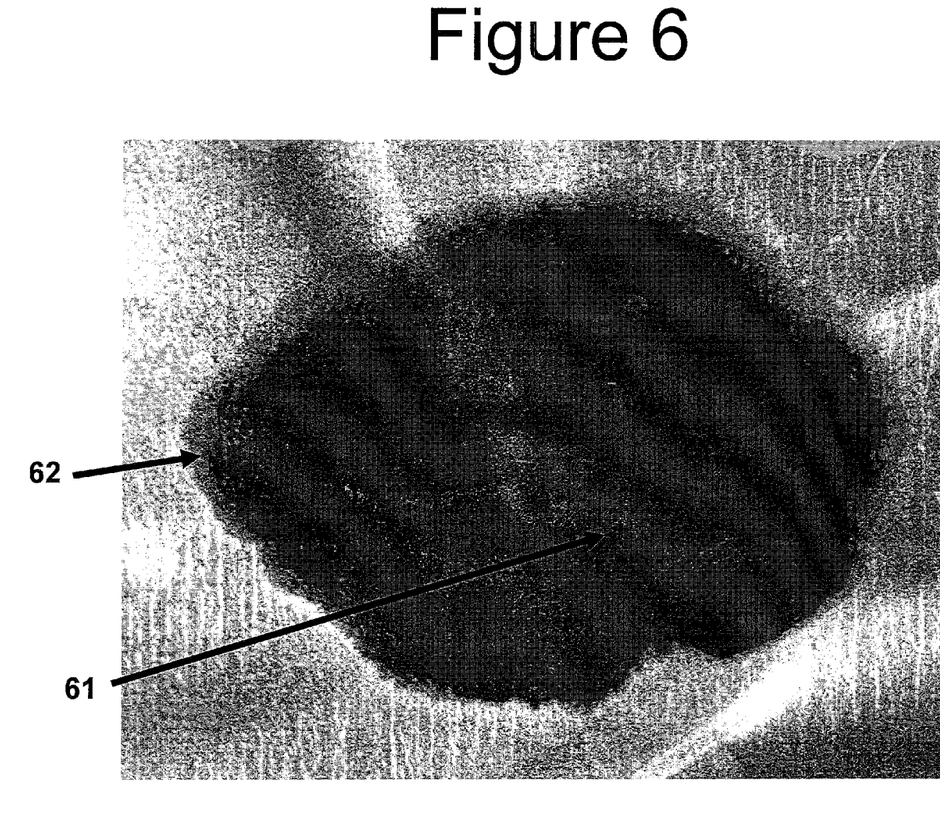
FIG. 6 is a top view of a self clearing event in a metalized film capacitor according to an exemplary embodiment of the present invention.

In addition to the aforementioned dielectric material needs for a film-foil capacitor, a metalized film capacitor requires a dielectric material that self clears. Some polymers, such as Kapton, form resistive channels when a breakdown event occurs thus decreasing the insulation resistance of the capacitor. Inventive Examples 3 and 4 capacitors were tested for self clearing by raising the test voltage until a dielectric breakdown event occurs. The capacitors were then unwound and the metalized film was examined in the area of the breakdown. FIG. 6 shows a picture of a clearing event. The hole 61 in the polymer is approximately 25 μm in diameter and the metal clearing area 62 is approximately 1.6 mm in diameter. High voltage testing of Inventive Example 3 and 4 capacitors indicated that the dielectric film self clears appropriately.

The present invention provides a single layer of metalized PTFE film that has been used in a capacitor. Furthermore, this result is even more impressive when considering Inventive Example 4 is only 6 um thick. Previous attempts at manufacturing PTFE capacitors required the use of multiple layers of PTFE film to circumvent the poor dielectric strength and poor mechanical strength of available PTFE films.

The needs for a high operating temperature capacitor requires a film that does not stretch when wound into rolls, has a high dielectric breakdown strength to enable higher operating voltages, is thin to enable smaller volume packages, can be metalized, and can self clear. To understand the uniqueness of the film used in the Inventive Examples cited comparative PTFE films (Film C and D) were tested were tested and compared to Film B.

Figure 7:
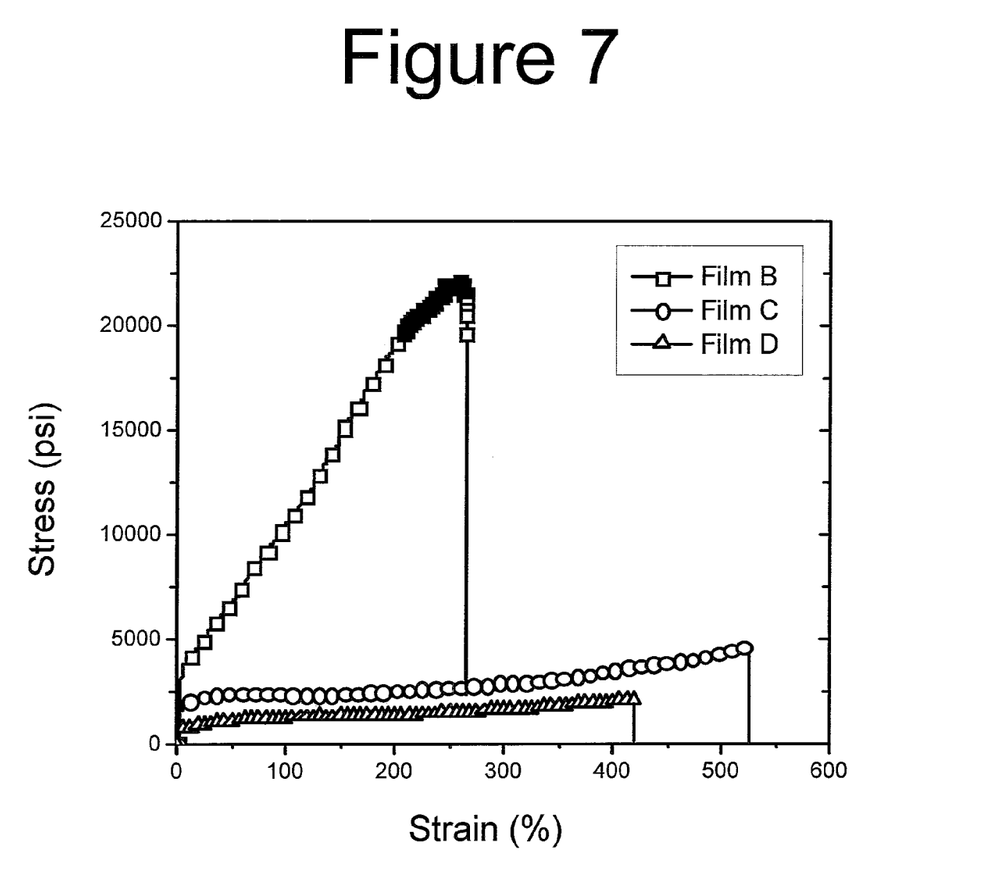
FIG. 7 is a stress-strain curve for certain films used in inventive and comparative examples.

The tensile strengths of the PTFE films were measured with a TA.xt Plus Texture Analyzer following the procedures outlined in ASTM D882-10 using a dog-bone shaped sample. The maximum tensile strength of Film B, the Gore PTFE film, was measured to be 20,780 PSI whereas Film C (cast PTFE) was 4,571 PSI and Film D (skived PTFE) was 5,050 PSI. The tensile yield strength of Film A was measured to be 4,267 PSI whereas Film C was 711 PSI and Film D was 1,422 PSI. FIG. 7 shows these tensile strengths for the different PTFE films in graph form.

Figure 8:
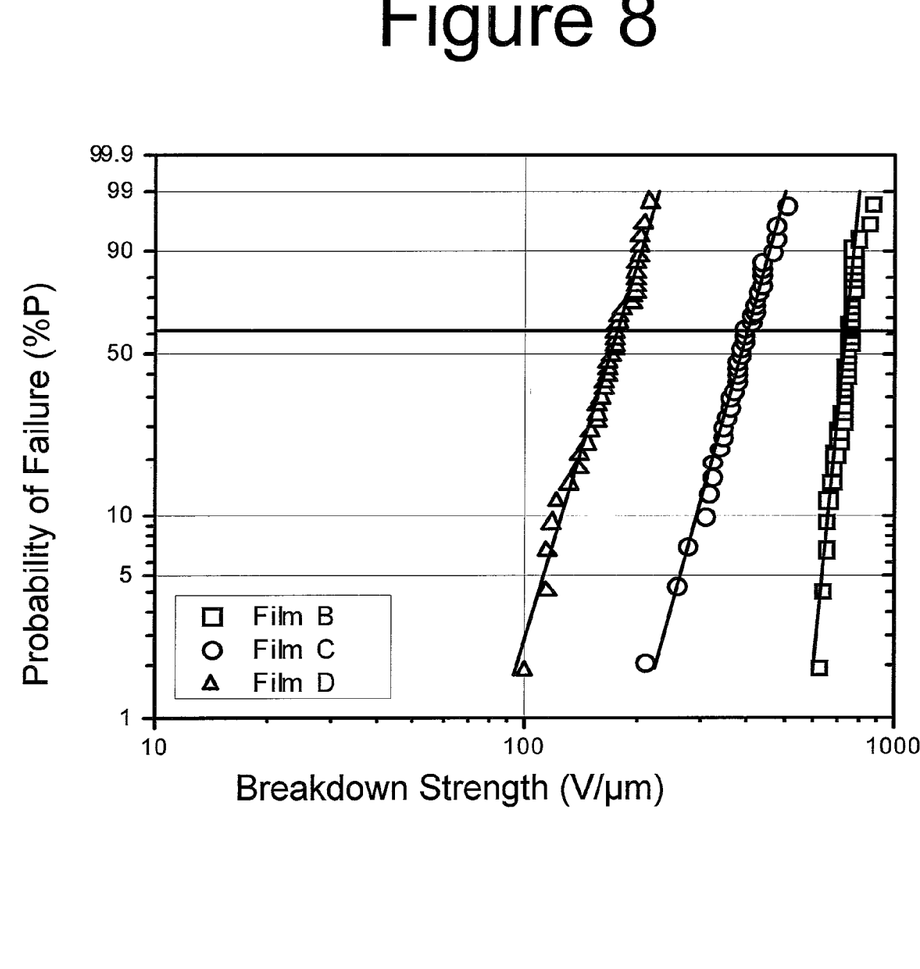
FIG. 8 is graph comparing breakdown strengths of certain films used in inventive and comparative examples.

FIG. 8 compares the breakdown strengths for the various PTFE films. The test procedure followed ASTM D3755-97 (2004). In this process, greater than 25 individual test points are brought into direct contact between the electrodes consisting of metalized biaxial oriented polypropylene. A 3 mil Kapton film with a defined circular hole (or window), featuring a diameter of 0.25 inches, was placed on top of the PTFE film to constrain location and size of contact area. Contact to the PTFE film occurred between the bottom metalized polypropylene film and the top metalized polypropylene film only within the hole found in the Kapton film. An Associated Research Hypot Dielectric Analyzer Model 7720 is used to ramp the voltage at 500V/s until breakdown occurs at which point the voltage is recorded.

In order to get accurate breakdown voltage measurements, a method of measuring precise film thickness is required. To accomplish this, a MeasureItAll LE 1000-2 measurement gauge was outfitted with a slow descent pneumatic actuator and placed in a vibration and air current isolating enclosure to increase accuracy and repeatability to less than 0.1 μm.

FIG. 8 shows a Weibull plot comparing dielectric breakdown field strength (normalized for thickness) for Films B, C, and D. Film B, the Gore PTFE film, had a characteristic breakdown strength, defined as the breakdown strength at a probability of failure of 63.2%, of 756 V/um compared to 403 V/um for Film C and 180 V/um for Film D.

Particular embodiments of the present invention have been fabricated with an industry common wound film construction. The invention could also be embodied in a stacked film or planar construction that is also practiced in the industry. While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. A capacitor having a first end and a second end and comprising a first electrode, a second electrode, a first dielectric layer, and a second dielectric layer, wherein each of the first and second dielectric layers comprise a PTFE film having a dielectric strength greater than about 500 V/μm, a tensile strength of greater than about 10,000 psi in at least one direction, and a thickness less than about 20 microns, wherein said first dielectric layer is disposed between said first electrode and said second electrode, wherein said second dielectric layer is disposed on said second electrode on a surface opposite to said first dielectric layer, wherein said first electrode has an exposed surface opposite to the said first dielectric layer, wherein said first electrode, said second electrode, and said first and second dielectric layers have a configuration defining alternating layers with a stagger between said alternating layers such that said first electrode is at said first end of said capacitor and said second electrode is at said second end of said capacitor.

2. The capacitor as defined in claim 1 wherein said PTFE film is a densified expanded PTFE film.

3. The capacitor as defined in claim 1 wherein the thickness of at least one of said first and second electrodes is less than about 100 nm.

4. The capacitor as defined in claim 3 wherein said at least one of said first and second electrodes is deposited by a process of vacuum deposition.

5. The capacitor as defined in claim 1 at least one of said first and second electrodes is a metal foil with a thickness greater than about 2 microns.

6. The capacitor as defined in claim 1 that is self-clearing.

7. The capacitor as defined in claim 1 wherein each of the first and second dielectric layers has a dielectric breakdown strength at room temperature of greater than 700 V/micron.

8. The capacitor as defined in claim 1 that has a capacitance change of less than 10% from room temperature to about 250° C.

9. The capacitor as defined in claim 1 wherein each of the first and second dielectric layers has a thickness less than about 15 microns.

10. The capacitor as defined in claim 1 wherein each of the first and second dielectric layers has a thickness less than about 10 microns.

11. The capacitor as defined in claim 1 wherein each of the first and second dielectric layers has a thickness of about 6 microns.

12. A capacitor having a first end and a second end and comprising a first electrode, a second electrode, a first dielectric layer, and a second dielectric layer, wherein each of the first and second dielectric layers comprise a PTFE film having a dielectric strength greater than about 500 V/μm, a tensile yield strength of greater than about 2,000 psi in at least one direction, and a thickness less than about 20 microns, wherein said first dielectric layer is disposed between said first electrode and said second electrode, wherein said second dielectric layer is disposed on said second electrode on a surface opposite to said first dielectric layer, wherein said first electrode has an exposed surface opposite to the said first dielectric layer, wherein said first and second dielectric layers have a configuration defining alternating layers with a stagger between said alternating layers such that said first electrode is at said first end of said capacitor and said second electrode is at said second end of said capacitor.

13. The capacitor as defined in claim 12 wherein said PTFE film is a densified expanded PTFE film.

14. The capacitor as defined in claim 12 wherein the thickness of at least one of said first and second electrodes is less than about 100 nm.

15. The capacitor as defined in claim 14 wherein said at least one of said first and second electrodes is deposited by a process of vacuum deposition.

16. The capacitor as defined in claim 12 at least one of said first and second electrodes is a metal foil with a thickness greater than about 2 microns.

17. The capacitor as defined in claim 12 that is self-clearing.

18. The capacitor as defined in claim 12 wherein each of the first and second dielectric layers has a dielectric breakdown strength at room temperature of greater than 700 V/micron.

19. The capacitor as defined in claim 12 that has a capacitance change of less than 10% from room temperature to about 250° C.

20. The capacitor as defined in claim 12 wherein each of the first and second dielectric layers has a thickness less than about 15 microns.

21. The capacitor as defined in claim 12 wherein each of the first and second dielectric layers has a thickness less than about 10 microns.

22. The capacitor as defined in claim 12 wherein each of the first and second dielectric layers has a thickness of about 6 microns.

23. The capacitor as defined in claim 1 wherein said configuration is a rolled capacitor.

24. The capacitor as defined in claim 1 wherein said configuration is a stacked capacitor.

25. The capacitor as defined in claim 12 wherein said configuration is a rolled capacitor.

26. The capacitor as defined in claim 12 wherein said configuration is a stacked capacitor.

* * * * *